(12) United States Patent
Chou

(10) Patent No.: US 6,336,526 B1
(45) Date of Patent: Jan. 8, 2002

(54) BICYCLE DISK BRAKE

(76) Inventor: Tzu-Chieh Chou, 7F-1, No. 626, Chung Met Street, Taichung (TW)

( * ) Notice: Subject to any disclaimer, the term of this patent is extended or adjusted under 35 U.S.C. 154(b) by 0 days.

(21) Appl. No.: 09/533,656

(22) Filed: Mar. 23, 2000

(51) Int. Cl.[7] .................................................. B62L 5/00
(52) U.S. Cl. ...................................... 188/26; 188/24.11
(58) Field of Search ................................ 188/24.11, 26, 188/218 XL, 24.22, 72.1, 72.3, 72.9, 196 BA, 72.8

(56) References Cited

U.S. PATENT DOCUMENTS

| | | | | |
|---|---|---|---|---|
| 3,765,511 A | * | 10/1973 | Toyomasu | 188/26 |
| 5,636,716 A | * | 6/1997 | Sugimoto et al. | 188/24.22 |
| 5,960,914 A | * | 10/1999 | Isai | 188/72.8 |
| 6,148,964 A | * | 11/2000 | Huang | 188/26 |
| 6,206,144 B1 | * | 3/2001 | Di Bella | 188/26 |

FOREIGN PATENT DOCUMENTS

JP    2159403 A   *  6/1990

* cited by examiner

*Primary Examiner*—Douglas C. Butler
*Assistant Examiner*—Melanie Torres
(74) *Attorney, Agent, or Firm*—Browdy and Neimark

(57) ABSTRACT

A bicycle disk brake comprises a frame, a braking clamp set, and a connection member for connecting the braking clamp set with the frame which is mounted on the front fork or rear fork of a bicycle. The connection member is formed of two bolts, two first protruded collars, two second protruded collars, and two recessed collars, which enable the braking clamp set to be adjusted in position and angle relative to the frame such that the two brake shoes of the braking clamp set are located at an optimal position to clamp a braking disk to slow down or stop the bicycle in motion.

6 Claims, 5 Drawing Sheets

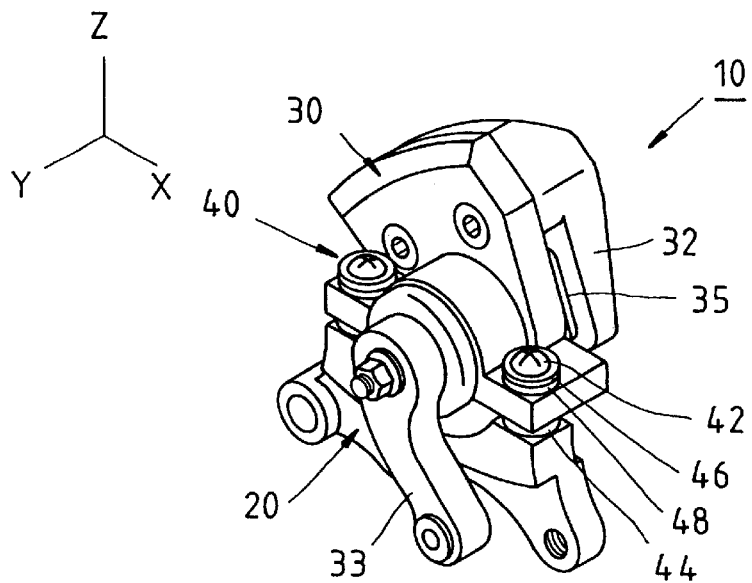
FIG. 1
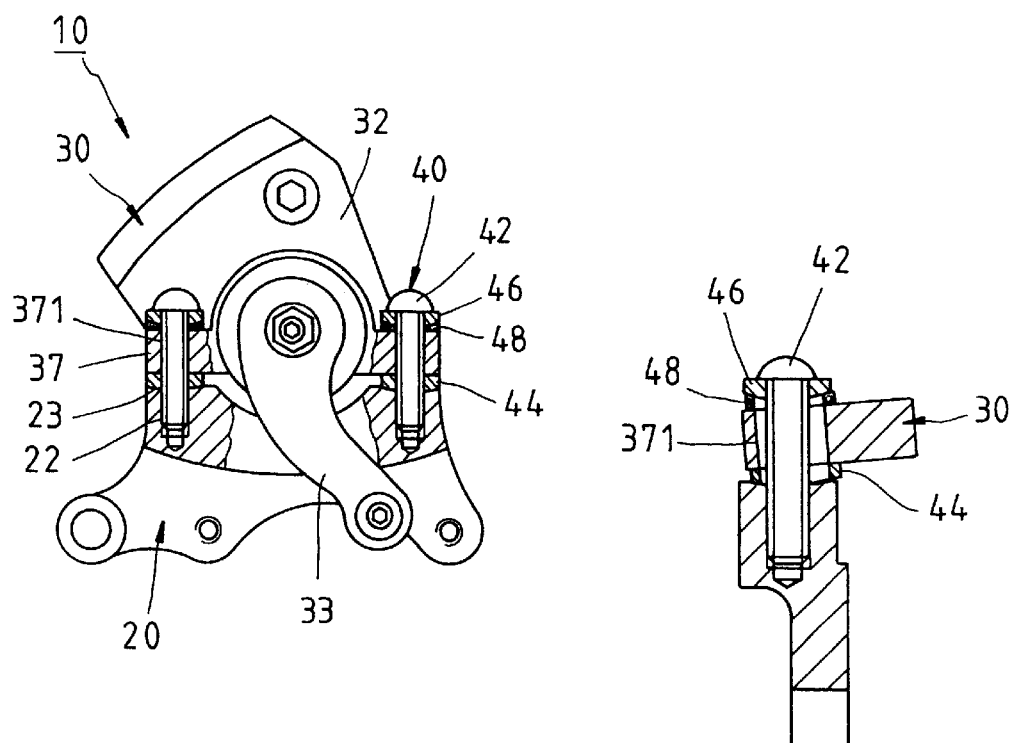
FIG. 3
FIG. 7

BICYCLE DISK BRAKE

FIELD OF THE INVENTION

The present invention relates generally to a bicycle, and more particularly to a disk brake of the bicycle.

BACKGROUND OF THE INVENTION

The conventional disk brake of a bicycle is mounted on the front fork or rear fork of the bicycle and is activated by the brake cable to bring about a braking effect to slow down or stop the bicycle in motion. The effectiveness and the precision of the braking effect of the bicycle disk brake depend on the structural and the functional cooperations between the disk brake and the braking disk. The conventional bicycle disk brake does not work well in view of the fact that the disk brake and the braking disk of the conventional bicycle disk brake are not well coordinated and are susceptible to wear due to friction.

SUMMARY OF THE INVENTION

The primary objective of the present invention is to provide a bicycle disk brake which is adjustable in angle and position in relation to a braking disk.

In keeping with the principle of the present invention, the foregoing objective of the present invention is attained by a bicycle disk brake comprising a frame which is mounted on the front fork or rear fork of a bicycle and is provided with two threaded holes parallel to each other. The two threaded holes have an open end which is provided with an annular receiving portion. The disk brake further comprises a braking clamp set formed of a seat body, a rocking arm pivoted with the seat body such that the rocking arm is fastened at the free end thereof with a steel cable, and two brake pieces surrounding a braking disk. The seat body is provided with a connection portion extending therefrom and having two through holes corresponding in location to the two threaded holes of the frame. A connection member is composed of two bolts, which are engaged with the two threaded holes of the frame via the two through holes of the connection portion of the braking clamp set. Each bolt is fitted over by a first protruded collar and is located between the connection portion of the braking clamp set and the frame. Each bolt is further fitted over by a second protruded collar such that the head of the bolt is attached with a first side of the second protruded collar, and that the second side is of the curved surface. Two recessed collars are respectively fitted over the bolts and are located between the second protruded collar and the connection portion of the braking clamp set. The braking clamp set can be coordinated with the position of the braking disk in relation to the adjustment position and angle of the frame, thereby enabling the two brake pieces to remain parallel to the braking disk and apart from the braking disk by an appropriate distance.

BRIEF DESCRIPTION OF THE DRAWINGS

FIG. 1 shows a perspective view of a first preferred embodiment of the present invention.

FIG. 3 shows a front sectional view of the first preferred embodiment of the present invention.

FIG. 7 shows a schematic view of the first preferred embodiment of the present invention in the state of a third action.

DETAILED DESCRIPTION OF THE INVENTION

Figure 2:
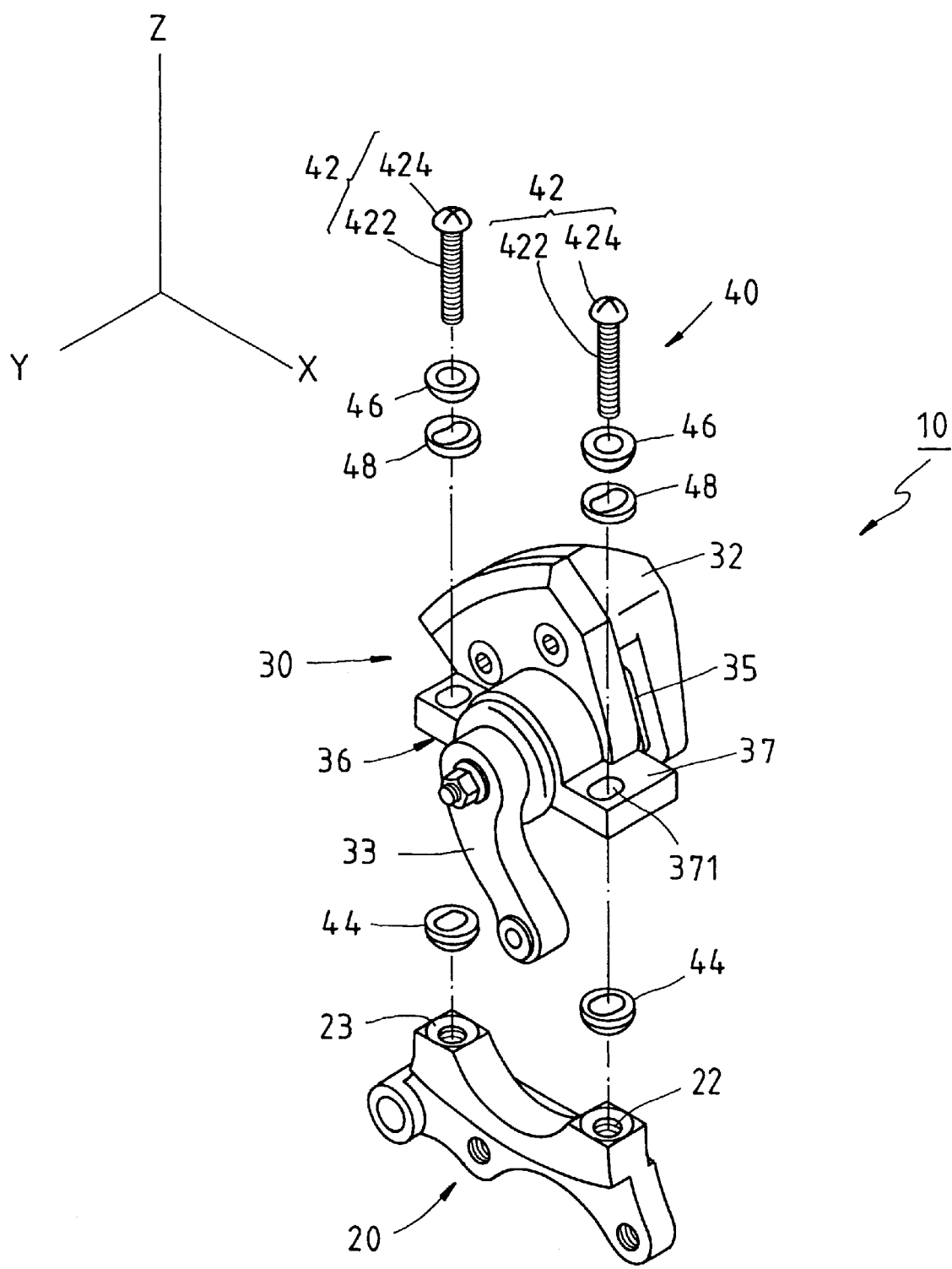
FIG. 2 shows an exploded view of the first preferred embodiment of the present invention.
Figure 4:
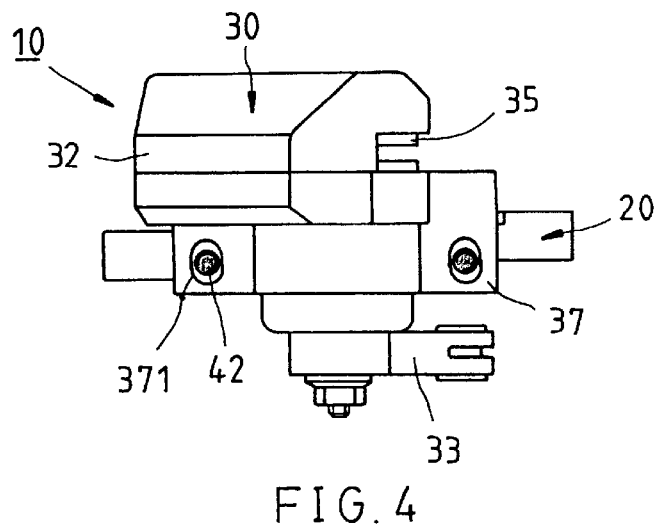
FIG. 4 shows a partial top sectional view of the first preferred embodiment of the present invention.

As shown in FIGS. 1–9, a bicycle disk brake 10 embodied in the present invention is mounted on a bicycle front fork 2 or rear fork 3 such that the bicycle disk brake 10 is connected with a steel cable 4 for effecting a braking action by a braking disk 5. The disk brake 10 comprises a frame 20, a braking clamp set 30, and a connection member 40.

The frame 20 is provided with two threaded holes 22 parallel to each other and having a longitudinal direction parallel to the surface of the braking disk 5. The frame 20 is provided with two receiving portions 23 which are respectively located annularly around the edge of the open end of the threaded holes 22. The receiving portions 23 have a surface. The surfaces of the receiving portions 23 are located on the same spherical surface.

The braking clamp set 30 comprises a seat body 32, a rocking arm 33, and two brake pieces 35. The seat body 32 has an inverted U-shaped cross section and is dimensioned to receive the braking disk 5. The rocking arm 33 is fastened pivotally with one side of the seat body 32 such that the rocking arm 33 is connected at the free end thereof with the steel cable 4. The brake pieces 35 are fastened with two opposite inner sides of the seat body 32 and are located at two sides of the braking disk 5. When the rocking arm 33 is pulled by the steel cable 4, the two brake pieces 35 are actuated to clamp the braking disk 5, thereby resulting in a braking effect. The braking clamp set 30 is similar in construction to the prior art device. The seat body 32 is provided with a connection portion 36 extending therefrom and having two cross extension pieces 37. The two cross extension pieces 37 are provided with a through hole 371 corresponding in location to the threaded hole 22 of the frame 20. The through hole 371 has an oval cross section. The longitudinal axis of the oval through hold 371 is perpendicular to the braking disk 5.

The connection member 40 is composed of two bolts 42, two first protruded collars 44, two second protruded collars 46, and two recessed collars 48. The bolts 42 are engaged with the threaded holes 22 of the frame 20 via the through holes 371 of the cross extension pieces 37 of the braking clamp set 30. The braking clamp set 30 and the frame 20 are thus fastened together by the two bolts 42, which have a shank 422 with an outer diameter smaller than the short axis of the through hole 371. As a result, the shank 422 of the bolts 42 is not in contact with the inner side wall of the through hole 371. The first protruded collars 44 are respectively fitted over the shank 422 of the bolts 42 and are located between the cross extension piece 37 and the frame 20 such that the top side of the first protruded collar 44 is attached to the cross extension piece 37 of the braking clamp set 30, with the bottom side of the first protruded collar 44 being convex and attached to the receiving portion 23 of the frame 20. The second protruded collars 46 are respectively fitted over the shank 422 of the bolts 42 such that the top side of the collar 46 is attached to a head 424 of the bolt 42, and that the bottom side of the collar 46 is convex. The recessed collars 48 are respectively fitted over the shank 422 of the bolts 42 and are located between second protruded collars 46 and the cross extension pieces 37 of the braking clamp set 30. The bottom sides of the recessed collars 48 are attached with the cross extension pieces 37 of the braking clamp set 30, whereas the top sides of the recessed collars 48 are concave and attached with the bottom sides of the second protruded collars 46.

The disk brake 10 of the present invention is mounted on the bicycle front fork 2 or rear fork 3 by the frame 20 which is connected with the braking clamp set 30 by the connection member 40. Initially, the bolts 42 of the connection member 40 are not tightened so as to enable the braking clamp set 30 to be adjusted in relation to the braking disk 5. The adjustment of the braking clamp set 30 is described hereinafter.

Figure 5:
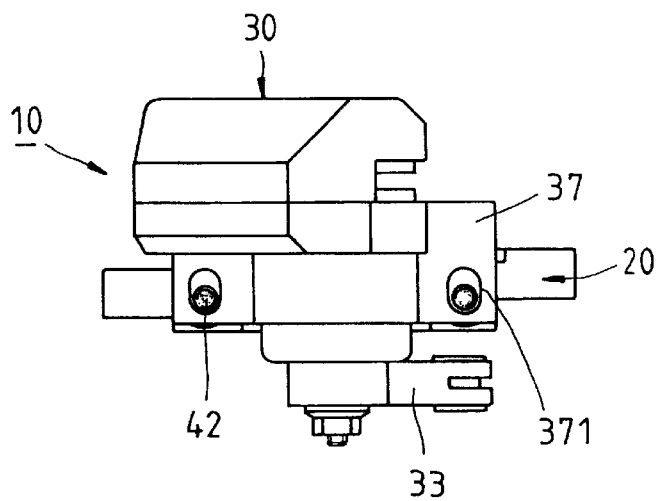
FIG. 5 shows a schematic view of the first preferred embodiment of the present invention in the state of a first action.
Figure 6:
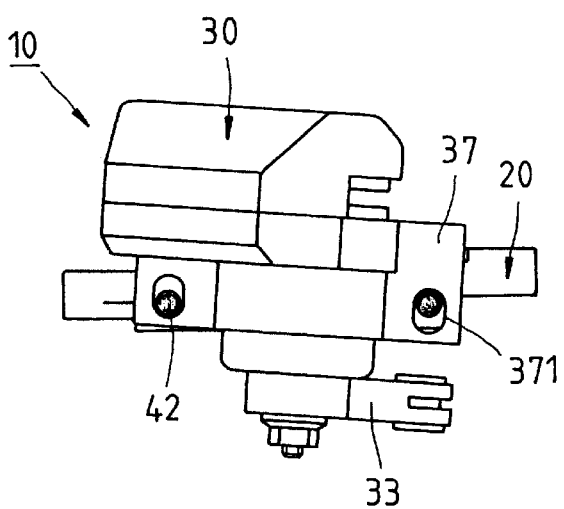
FIG. 6 shows a schematic view of the first preferred embodiment of the present invention in the state of a second action.
Figure 9:
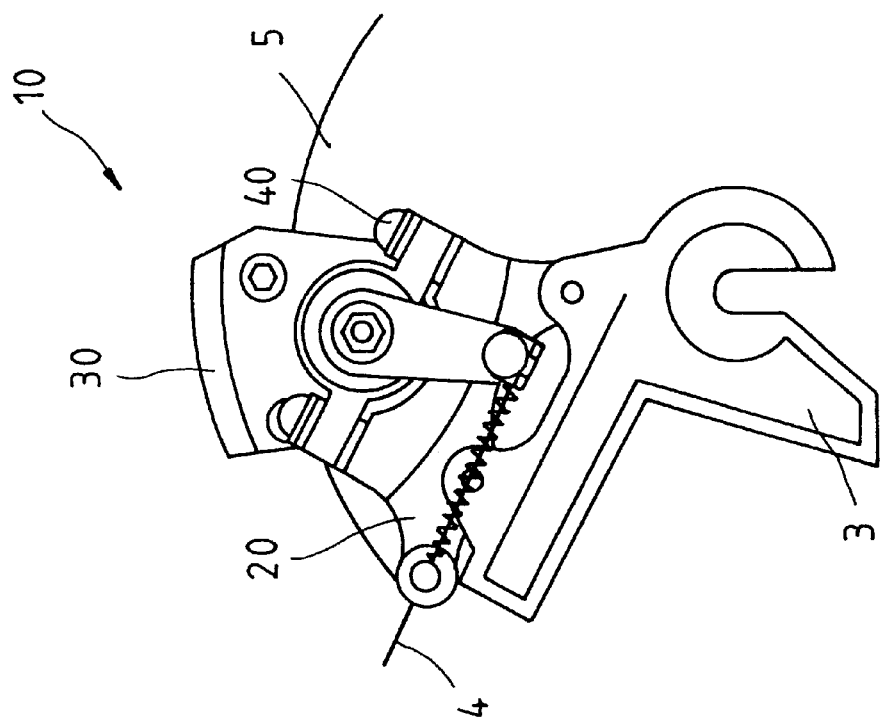
FIG. 9 shows a schematic view of the first preferred embodiment of the present invention mounted on a bicycle rear fork.
Figure 8:
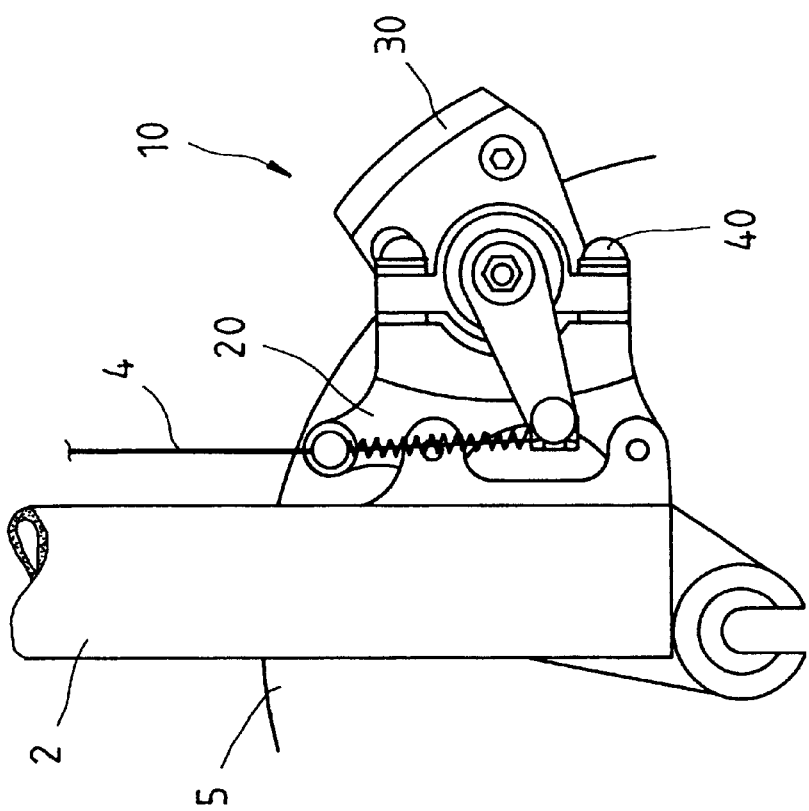
FIG. 8 shows a schematic view of the first preferred embodiment of the present invention mounted on a bicycle front fork.

In light of the outer diameter of the bolts 42 being smaller than the length of the longitudinal axis of the through hole 371 of the braking clamp set 30, the bolts 42 can be displaced along the direction of the longitudinal axis of the through hole 371. As a result, the braking clamp set 30 can be displaced in the direction of the Y-axis in relation to the frame 20 and the connection member 40, as illustrated in FIGS. 1 and 5. For the same reason, the braking clamp set 30 can be rotated around the direction of the Z-axis in relation to the frame 20 and the connection member 40, as shown in FIGS. 1 and 6. The bottom side of the first protruded collar 44 is slid in relation to the frame 20. The bottom side of the second protruded collar 46 is slid in relation to the top side of the recessed collar 48. As a result, the braking clamp set 30 can be turned around the X-axis in relation to the frame 20, as shown in FIGS. 1 and 7.

It is therefore readily apparent that the braking clamp set 30 of the bicycle disk brake 10 of the present invention can be adjustably located at an optimal position and an optimal angle by displacing the braking clamp set 30 along the direction of the Y-axis, and by turning the braking clamp set 30 around the Z-axis and the X-axis. After the braking clamp set 30 is appropriately located to cooperate with the braking disk 5, the bolts 42 can be tightened. As a result, the two brake pieces 35 of the disk brake 10 are parallel to the braking disk 5 and are separated from the braking disk 5 by an appropriate distance.

Figure 10:
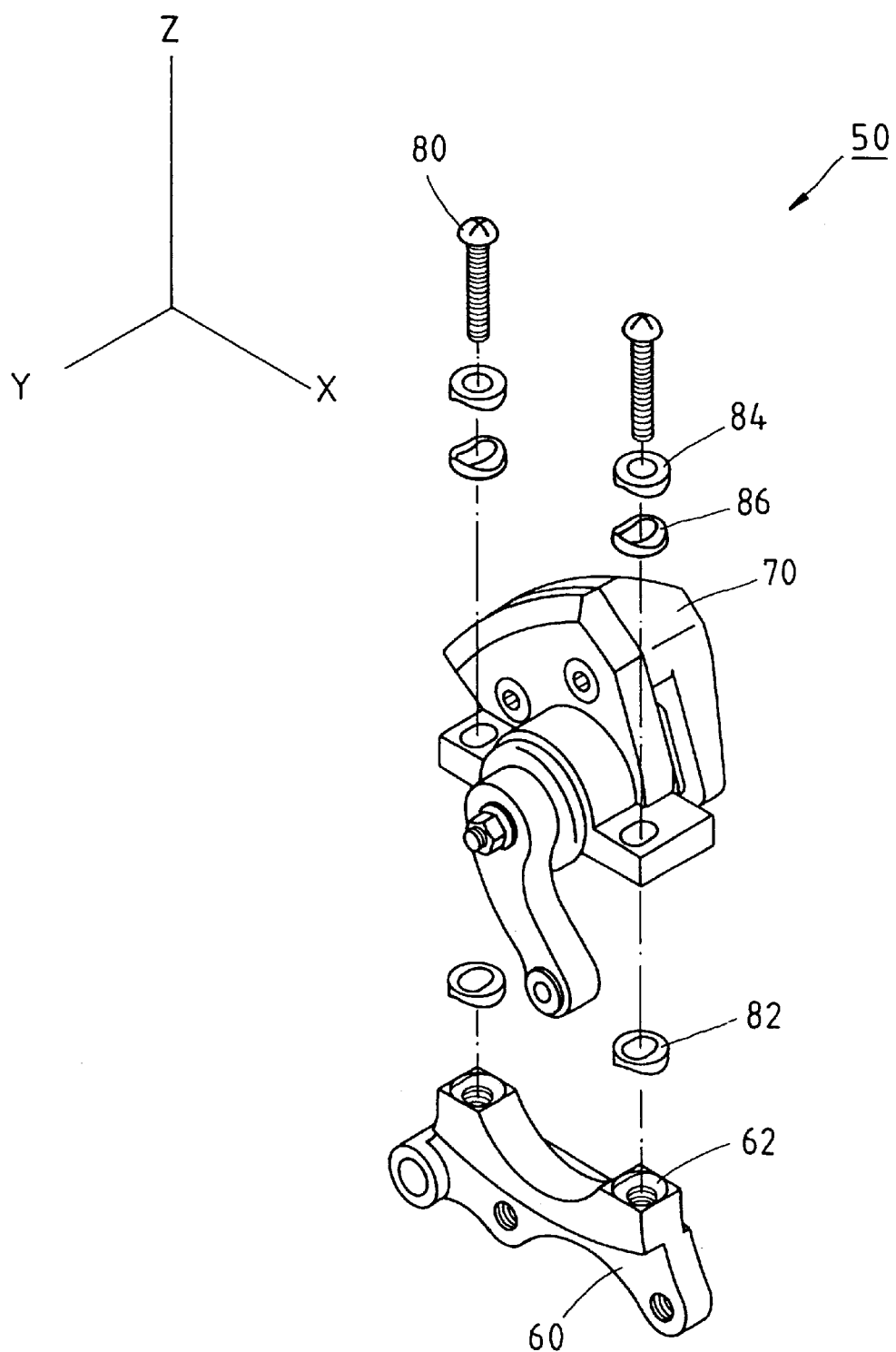
FIG. 10 shows a perspective view of a second preferred embodiment of the present invention.

As shown in FIG. 10, a bicycle disk brake 50 of the second preferred embodiment of the present invention is basically similar in construction to the bicycle disk brake 10 of the first preferred embodiment, except that the former comprises a frame 60 which is provided with a receiving portion 62 having a concave surface. In other words, the receiving portion 62 is arcuate only along the Y-axis direction and is linear along the X-axis direction. The first protruded collar 82 of the connection member 80 of the bicycle disk brake 50 is attached at the convex bottom side thereof with the receiving portion 62. The second protruded collar 84 has a convex bottom side, whereas the recessed collar 86 has a concave top surface capable of being attached to the second protruded collar 84. The braking clamp set 70 of the bicycle disk brake 50 can be displaced along the Y-axis direction. In the meantime, the braking clamp set 70 can be turned around the Z-axis and the Y-axis. As a result, the braking clamp set 70 can be adjusted in position and angle so as to cooperate optimally with the braking disk 5.

What is claimed is:

1. A bicycle disk brake mounted on a bicycle front fork or rear fork such that said bicycle disk brake is pulled by a steel cable to clamp a braking disk to slow down or stop the bicycle in motion, said disk brake comprising:

a frame mounted on the bicycle front fork or rear fork and provided with two threaded holes parallel to each other and having a longitudinal axis parallel to the surface of the braking disk, said frame further provided with two receiving portions located annularly around the edge of an open end of said two threaded holes;

a braking clamp set comprising a seat body, a rocking arm pivoted to said seat body and fastened at a free end thereof with the steel cable, and two brake pieces located at two opposite sides of the braking disk whereby said rocking arm is pulled by the steel cable to actuate said two brake pieces to clamp the braking disk, said seat body provided with a connection portion extending therefrom and having two through holes corresponding in location to said two threaded holes of said frame; and a connection member comprising two bolts, two first protruded collars, two second protruded collars, and two recessed collars, said two bolts intended for use in fastening said braking clamp set with said frame such that said two bolts are engaged with said two threaded holes of said frame via said two through holes of said connection portion of said seat body of said braking clamp set, and that said two bolts do not come in contact with the inner side walls of said two through holes, said two first protruded collars being fitted over said bolts and located between said frame and said connection portion of said braking clamp set such that a first side of said first protruded collars is joined with said connection portion of said braking clamp set, and that a second convex side of said first protruded collars is joined with said receiving portion of said frame, said two second protruded collars being fitted over said bolts such that a first side of said second protruded collars is joined with a head of said bolts, said two recessed collars being fitted over said bolts and located between said second protruded collar and said connection portion of said braking clamp set such that a first side of said recessed collars is joined with said connection portion of said braking clamp set, and that a second concave side of said recessed collars is joined with said second protruded collar;

said braking clamp set being adjustable in position and angle in relation to said frame such that said two brake pieces are parallel to braking disk and are separated from the braking disk by a distance, wherein said receiving portions of said frame have a concave surface.

2. The bicycle disk brake as defined in claim 1, wherein said receiving portions of said frame have a spherical surface.

3. The bicycle disk brake as defined in claim 1, wherein said second protruded collars have a second side of a spherical profile.

4. The bicycle disk brake as defined in claim 1, wherein said second protruded collars have a second side of a convex profile.

5. The bicycle disk brake as defined in claim 1, wherein said connection portion of said braking clamp set comprises two cross extension pieces; and wherein said two through holes of said connection portion are located in said two cross extension pieces.

6. The bicycle disk brake as defined in claim 1, wherein said through holes of said braking clamp set have an oval cross section and a longitudinal axis perpendicular to the braking disk.

* * * * *